(12) United States Patent
Morikawa et al.

(10) Patent No.: US 11,230,644 B1
(45) Date of Patent: Jan. 25, 2022

(54) COATING FILM-FORMING COMPOSITION, METHOD FOR PRODUCING SURFACE-TREATED METAL MEMBER, AND METHOD FOR PRODUCING METAL-RESIN COMPOSITE

(71) Applicant: MEC COMPANY LTD., Hyogo (JP)

(72) Inventors: Koki Morikawa, Hyogo (JP);
Masahiro Hayashizaki, Hyogo (JP);
Motohiro Nakano, Hyogo (JP);
Masataka Araki, Hyogo (JP)

(73) Assignee: MEC COMPANY LTD., Hyogo (JP)

( * ) Notice: Subject to any disclaimer, the term of this patent is extended or adjusted under 35 U.S.C. 154(b) by 0 days.

(21) Appl. No.: 17/188,460

(22) Filed: Mar. 1, 2021

(30) Foreign Application Priority Data

Jul. 20, 2020 (JP) .............................. JP2020-123895

(51) Int. Cl.
*C09D 1/00* (2006.01)
*B32B 37/12* (2006.01)
*B32B 15/08* (2006.01)
*B32B 15/20* (2006.01)

(52) U.S. Cl.
CPC ................ *C09D 1/00* (2013.01); *B32B 15/08* (2013.01); *B32B 15/20* (2013.01); *B32B 37/12* (2013.01); *B32B 2255/06* (2013.01); *B32B 2255/24* (2013.01); *B32B 2311/12* (2013.01)

(58) Field of Classification Search
CPC ........... C09D 1/00; B32B 37/12; B32B 15/08; B32B 15/20
USPC ........................................................ 156/326
See application file for complete search history.

(56) References Cited

U.S. PATENT DOCUMENTS

| 5,037,482 A | 8/1991 | Kukanskis et al. |
| 5,498,301 A * | 3/1996 | Hirao .................... C23F 11/149 |
| | | 106/14.15 |
| 2002/0114956 A1* | 8/2002 | Tomonaga ............ C03C 17/008 |
| | | 428/432 |

(Continued)

FOREIGN PATENT DOCUMENTS

| EP | 0 364 132 | 4/1990 |
| EP | 3 636 802 | 4/2020 |

(Continued)

OTHER PUBLICATIONS

Notice of Reasons for Refusal dated Aug. 25, 2020 in corresponding Japanese Patent Application No. JP 2020-123895, together with translation thereof.

(Continued)

*Primary Examiner* — Tahseen Khan
(74) *Attorney, Agent, or Firm* — Wenderoth, Lind & Ponack, L.L.P.

(57) ABSTRACT

Provided are a coating film-forming composition for forming a coating film on a metal surface that exhibits excellent adhesiveness between a metal and a resin, and a surface-treated metal member having a coating film formed by using the composition. The coating film-forming composition is a solution containing a silane coupling agent having an amino group, a metallic ion and a halide ion. The metallic ion is preferably a copper ion, and a copper ion concentration in the solution is preferably 0.1 to 60 mM. The amount of Si based on the amount of Cu in the solution is preferably 30 or less, in terms of molar ratio. The pH of the solution is preferably 2.8 to 6.2.

6 Claims, 1 Drawing Sheet

(56) References Cited

U.S. PATENT DOCUMENTS

| | | | |
|---|---|---|---|
| 2002/0192460 A1 | 12/2002 | Kawaguchi et al. | |
| 2008/0264900 A1 | 10/2008 | Feng et al. | |
| 2015/0152124 A1 | 6/2015 | Mori et al. | |
| 2019/0003062 A1* | 1/2019 | Matsumoto | H05K 3/383 |
| 2019/0127606 A1* | 5/2019 | Akiyama | C09J 11/04 |
| 2020/0031852 A1 | 1/2020 | Murai et al. | |
| 2020/0040460 A1* | 2/2020 | Akiyama | B32B 15/08 |
| 2020/0157394 A1* | 5/2020 | Tomatsu | C09D 5/00 |
| 2020/0223875 A1* | 7/2020 | Yamaji | C23C 22/05 |
| 2020/0263308 A1* | 8/2020 | Ogino | C23F 1/18 |
| 2021/0179642 A1* | 6/2021 | Yamaji | C23C 22/05 |

FOREIGN PATENT DOCUMENTS

| | | | |
|---|---|---|---|
| JP | 02-093079 | 4/1990 | |
| JP | 04-218686 | 8/1992 | |
| JP | 10-088104 | 4/1998 | |
| JP | 2002-321310 | 11/2002 | |
| JP | 2009-263790 | 11/2009 | |
| JP | 2010-525175 | 7/2010 | |
| JP | 2015-214743 | 12/2015 | |
| JP | 2016-017221 | 2/2016 | |
| JP | 2016-56449 | 4/2016 | |
| JP | 2017-203073 | 11/2017 | |
| JP | 2017203073 A * | 11/2017 | H05K 3/38 |
| JP | 2018-016865 | 2/2018 | |
| JP | 2018-115306 | 7/2018 | |
| JP | 2018-188715 | 11/2018 | |
| JP | 2019059962 A * | 4/2019 | C23F 1/18 |
| WO | 2013/186941 | 12/2013 | |
| WO | WO-2017141799 A1 * | 8/2017 | H01L 21/306 |
| WO | 2017/195456 | 11/2017 | |
| WO | 2018/186476 | 10/2018 | |
| WO | 2019/058773 | 3/2019 | |
| WO | WO-2019058773 A1 * | 3/2019 | C07F 7/1804 |
| WO | 2021/045055 | 3/2021 | |

OTHER PUBLICATIONS

Decision to Grant dated Sep. 29, 2020 in corresponding Japanese Patent Application No. JP 2020-123895, together with translation thereof.

Extended European Search Report dated Jul. 15, 2021, in corresponding European Patent Application No. 21160629.8.

\* cited by examiner

COATING FILM-FORMING COMPOSITION, METHOD FOR PRODUCING SURFACE-TREATED METAL MEMBER, AND METHOD FOR PRODUCING METAL-RESIN COMPOSITE

TECHNICAL FIELD

The present invention relates to a coating film-forming composition for forming a coating film on a surface of a metal member for improving adhesiveness to a resin. Further, the present invention relates to a method for producing a surface-treated metal member using the coating film-forming composition, and also to a method for producing a metal-resin composite.

BACKGROUND ART

In the printed wiring board production process, a resin material such as an etching resist, a plating resist, a solder resist, or a prepreg is joined to the surface of a metal layer or a metal wiring. In the printed wiring board production process and also in the produced products, high adhesiveness is required between the metal and the resin. For improving adhesiveness between a metal and a resin, method is known in which a coating film (adhesive layer) for improving adhesiveness to a resin is formed on a surface of a metal.

For example, Patent Document 1 indicates that by plating a surface of an electrolytic copper foil with tin, then immersing the electrolytic copper foil in a silane coupling agent solution, and then performing rinsing and drying by heating, adhesiveness between the copper foil and a resin can be improved. Patent Document 2 and Patent Document 3 indicate that an adhesiveness between the metal and a resin can be improved by bringing a solution containing a specific silane compound into contact with the metal surface to form a coating film.

PRIOR ART DOCUMENTS

Patent Documents

Patent Document 1: JP 2009-263790 A
Patent Document 2: JP 2015-214743 A
Patent Document 3: WO2013/186941

SUMMARY OF THE INVENTION

Problems to be Solved by the Invention

According to the method of forming a coating film by a composition including silane compound as described in Patent Documents 2 and 3, it is not necessary to dispose an additional metal layer (e.g., tin-plated layer) for improving adhesiveness, so that the method is advantageous for simplifying the process of joining a metal and a resin. However, in the conventional compositions, since the film adhesion on a metal surface and surface treatment efficiency are poor, the adhesiveness between a metal and a resin may be insufficient. In addition, in order to sufficiently improve adhesiveness to a resin, it is necessary to increase the time period of contact between the composition (solution) and a metal, or form a coating film by drying the solvent under the condition where the solution is attaching to the surface of a metal.

In view of the above background, an object of the present invention is to provide a coating film-forming composition that is capable of forming a coating film having excellent adhesiveness to a resin on a metal surface in a simple way.

Means for Solving the Problems

The present inventors have conducted studies, and resultantly found that a composition containing a specific silane coupling agent, metallic ion and halide ion exhibits excellent coating film formability on a metal surface, and is capable of improving adhesiveness between metal and resin.

The coating film-forming composition of the present invention is a solution containing a silane coupling agent having at least one amino group, metallic ion, and halide ion. The metallic ion is preferably a copper ion, and the copper ion concentration in the solution is preferably 0.1 to 60 mM. The amount of Si based on the amount of Cu in the solution is preferably 30 or less, in terms of a molar ratio. The pH of the solution is preferably 2.8 to 6.2.

By bringing the coating film-forming composition described above into contact with a surface of a metal member, a coating film is formed on the metal member surface. The surface-treated metal member having a coating film formed thereon has excellent adhesiveness to a resin. The metal member may be a copper or copper alloy material.

Effects of the Invention

An adhesiveness between a metal member and a resin can be improved by forming a coating film on a surface of the metal member, such as copper or a copper alloy, using the coating film-forming composition of the present invention. When the metal member and a resin are joined together with the coating film therebetween, a metal-resin composite with an excellent adhesiveness at an interface between the metal member and the resin member can be obtained.

MODE FOR CARRYING OUT THE INVENTION

[Coating Film-Forming Composition]

Figure 1:
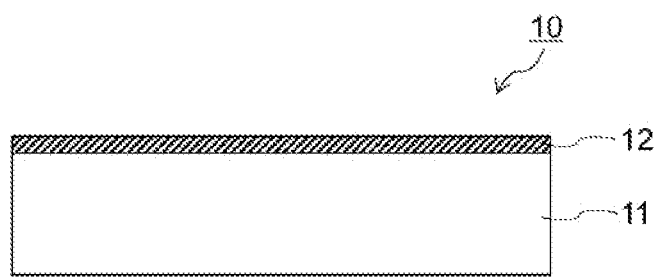
FIG. 1 is a schematic cross-sectional view showing one embodiment of a surface-treated metal member.

The coating film-forming composition of the present invention is used for forming a coating film on a metal surface. The coating film-forming composition is a solution with a pH of 2.8 to 6.2, and contains silane coupling agent, metallic ions, and halide ions. Hereinafter, each component contained in the coating film-forming composition will be described.

<Silane Coupling Agent>

The silane coupling agent is main component of a coating film. The silane coupling agent is a compound of the following general formula (I).

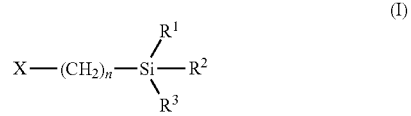

In the general formula (I), $R^1$, $R^2$ and $R^3$ are independently hydrogen atoms, hydroxyl groups, alkoxy groups or alkyl groups, and at least one of $R^1$ to $R^3$ is an alkoxy group or a hydroxyl group. From the viewpoint of coating film formability, it is preferable that all of $R^1$, $R^2$ and $R^3$ are alkoxy groups. Examples of the alkoxy group include a methoxy group, an ethoxy group, a propoxy group, an isopropoxy group, a butoxy group, an isobutoxy group, a tert-butoxy group, a pentyloxy group, and a hexyloxy group, and a methoxy group and an ethoxy group are preferable. The alkoxy group may be converted into a hydroxyl group by hydrolysis reaction.

In the general formula W), n is an integer of 1 to 50, preferably 1 to 10. In many of general-purpose product of silane coupling agents, n is 3.

In the general formula (I), X is an organic group containing an amino group. The amino group is preferably a primary amino group (—$NH_2$) or a secondary amino group (—NH—). The amino group present in X may be an amino group (—$NH_2$ or —NH—) present in a functional group such as amide, carbamide or ureido.

The amino group may be a heterocyclic amino group. The nitrogen atoms in a heterocyclic ring containing nitrogen atoms form secondary amino groups or tertiary amino groups. The heterocylic ring containing nitrogen atoms is preferably an aromatic ring. Examples of the nitrogen-containing aromatic ring in which nitrogen atoms of the heterocyclic ring form secondary amino groups include monocyclic rings such as pyrrole, pyrazole, imidazole, triazole, tetrazole, azepine, diazepine and triazepine; fused bicyclic rings such as indole, isoindole, thienomdole, indazole, purine and benzotriazole; fused tricyclic rings such as carbazole, ß-carboline, acridone, perimidine, phenazine and phenothiazine; fused tetracyclic rings such as quindoline and quinindoline; and fused pentacyclic rings such as acrindoline. The silane coupling agent containing a nitrogen-containing aromatic ring may further have an amino group outside the aromatic ring.

X may contain both an amino group and a nitrogen-containing functional group other than an amino group. X is particularly preferably one having —$NH_2$ at the terminal, i.e., one having a primary amino group. X may further have a nitrogen-containing functional group free of an amino group, such as a cyano group, a nitro group, an azo group, a diazo group or an azi group; or a functional group free of nitrogen atoms, such as a carbonyl group, a carboxy group, a mercapto group, an epoxy group, a silyl group, a silanol group or an alkoxysilyl group.

Examples of the silane coupling agent containing an amino group include compounds of the following general formula (II).

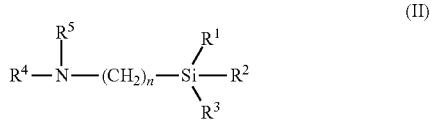

(II)

$R^1$ to $R^3$ and n in the general formula (W are the same as those in the general formula (I). $R^4$ is a hydrogen atom, and $R^5$ is a hydrogen atom or any organic group. When $R^5$ is an alkyl group or an aminoalkyl group, the number of carbon atoms of the alkyl group is preferably 6 or less, more preferably 4 or less.

$R^5$ is preferably a hydrogen atom, an alkyl group, an aryl group, an amino group, an aminoalkyl group or an (aminoalkyl)aminoalkyl group. Of these, $R^5$ is preferably a hydrogen atom, an aminoalkyl group or an (aminoalkyl)aminoalkyl group. When the silane coupling agent has a primary amino group (—$NH_2$) at the terminal, coating film formability tends to be enhanced, leading to improvement of adhesiveness with a resin.

Specific examples of the silane coupling agent in which $R^4$ is a hydrogen atom and $R^5$ is a hydrogen atom, an aminoalkyl group or an aminoalkylaminoalkyl group in the general formula (ID include: 3-aminopropyldimethylmethoxysilane, 3-aminopropylmethyldimethaxysilane, 3-aminopropylmethyldiethoxysilane, 3-aminopropyltrimethoxysilane, 3-aminopropyltriethoxysilane, 3-(2-aminoethylamino)propylmethyldimethoxysilane, 3-(2-aminoethylamino)propylmethyldiethoxysilane, 3-(2-aminoethylamino)propyltrimethoxysilane, 3-(2-aminoethylamino)propyltriethoxysilane, 3-[2-(2-aminoethylamino)ethylamino]propyltrimethoaysilane, and [3-(6-aminohexylamino)propyl]trimethoxysilane.

Like a compound of the following general formula (I), the silane coupling agent containing an amino group may have two Si atoms per molecule.

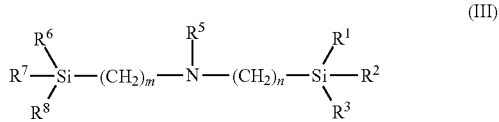

(III)

$R^1$ to $R^3$, $R^5$ and n in the general formula (III) are the same as in the general formula (II), and $R^5$ is preferably a hydrogen atom. $R^6$ to $R^8$ are the same as $R^1$ to $R^3$ and m is the same as n. Specific examples of the silane coupling agent of the general formula (III) include bis[3-(trimethoxysilyl)propyl]amine and bis[3-(triethoxysilyl)propyl]amine.

A commercialized product may be used as the silane coupling agent. As will be described later, the composition of the present invention contains halide ions and metallic ions in addition to the silane coupling agent, and has excellent coating film formability. Thus, any silane coupling agent containing an amino group can be used without particular limitation, and a coating film having excellent adhesiveness to a resin can be formed with a general-purpose silane coupling agent without use of one having a special chemical structure.

The concentration of the silane coupling agent in coating film-forming composition is not particularly limited, and is preferably 0.05 to 15 wt %, more preferably 0.1 to 10 wt %, still more preferably 0.2 to 5 wt %, from the viewpoint of achieving both coating film formability on a metal surface and solution stability. If the concentration of the silane coupling agent is excessively low, the coating film formation rate tends to decrease. On the other hand, even if the concentration of the silane coupling agent exceeds the above-described range, the coating film formation rate does not significantly increase, and the stability of the solution may decrease due to condensation of the silane coupling agent, etc. The concentration of Si atoms derived from the silane coupling agent in the solution in the coating film-forming composition is preferably 0.5 to 1000 mM, more preferably 1 to 500 mM, and may be 3 to 300 mM or 5 to 200 mM.

<Halide Ion>

The halide ion is a component that promotes coating film formation on a metal surface, and is preferably at least one kind selected from chloride ion, bromide ion, and iodide ion.

Among the halide ions, chloride ions and bromide ions are preferable, and bromide ions are particularly preferable, from the viewpoint of coating film formability coating film uniformity and adhesiveness to the resin. The coating film-forming composition may contain two or more kinds of halide ions.

Examples of halide ion sources include hydrohalic acids such as hydrochloric acid and hydrobromic acid; sodium chloride, calcium chloride, potassium chloride, ammonium chloride, potassium bromide, sodium bromide, potassium iodide, sodium iodide, copper chloride, copper bromide, zinc chloride, iron chloride, and tin bromide. Two or more kinds of halide ion sources may be used together. Copper halides such as copper chloride and copper bromide can be used as a compound having both functions of the halide ion source and the copper ion source because the copper halide generates a copper ion as well as a halide ion in the aqueous solution.

The concentration of the halide ion in the coating film-forming composition is not particularly limited, and may be 0.1 to 2000 mM, 0.5 to 1500 mM, 1 to 1000 mM, or 3 to 500 mM, for example.

<Metallic Ions>

The metallic ion, as well as the above-mentioned halide ion, is a component that promotes coating film formation on a metal surface. Examples of metallic ion include copper ions. The copper ion may be either a cuprous ion or a cupric ion. Examples of the copper ion source include copper halides such as copper chloride and copper bromide inorganic acid salts such as copper sulfate and copper nitrate; organic acid salts such as copper formate and copper acetate; copper hydroxide; and copper oxide. As described above, the copper halide acts as both a halide ion source and a copper ion source.

From the viewpoint of shortening the time required for coating film formation, the copper ion concentration in the coating film-forming composition is preferably 0.1 mM or more, more preferably 0.3 mM or more, and may be 0.5 mM or more, 0.8 mM or more, or 1 mM or more. On the other hand, if a cupric ion concentration is high, the promoting effect on etching of copper by oxidation becomes greater than the coating film formation promoting effect, so that formation of a coating film is hindered. Thus, the copper ion concentration in the coating film-forming composition is preferably 60 mM or less, more preferably 50 mM or less, and may be 40 mM or less, 30 mM or less, or 20 mM or less.

For promoting formation of a coating film, it is important to adjust the ratio of the silane coupling agent concentration to the copper ion concentration in addition to ensuring that the copper ion concentration in the solution is in the above-described range. The molar ratio Si/Cu which is a ratio between the amount of silane coupling agent-derived Si and the amount of Cu, is preferably 30 or less. If Si/Cu exceeds 30, the amount of copper ions for the silane coupling agent is insufficient, resulting in an insufficient coating film forming effect. The ratio of Si to Cu is preferably 25 or less, more preferably 20 or less, and may be 17 or less, or 15 or less. On the other hand, if the ratio of Si to Cu is excessively low, the coating film formation rate tends to decrease, or the effect of etching by copper ions tends to increase. Thus, the ratio of Si to Cu is preferably 0.3 or more, and may be 0.5 or more, or 1 or more.

<Solvent>

The coating film-forming composition is prepared by dissolving the above components in a solvent. The solvent is not particularly limited as long as the above components can be dissolved, and water, alcohols such as ethanol and isopropyl alcohol, esters, ethers, ketones, aromatic hydrocarbons, and the like may be used. As water, water from which ionic matters and impurities have been removed is preferable. For example, ion exchange water, pure water, ultrapure water, and the like are preferably used.

<Other Components>

The coating film-forming composition of the present invention may also contain components other than those mentioned above. Examples of other components include complexing agents, surfactants, stabilizers, silane coupling agents free of amino groups, and pH adjusters. When the metal surface is treated with a solution containing a silane coupling agent free of amino groups, copper ions and halide ions, smut is formed on the surface, so that it is difficult to form a coating film of the silane coupling agent. On the other hand, when an amino group-containing silane coupling agent and a silane coupling agent free of amino groups are used in combination, a coating film is formed on a metal surface in a short time as in the case of using only an amino group-containing silane coupling agent.

The complexing agent is preferably one that acts as a chelating agent. Examples of the chelating agent include amino acids, polybasic acids and hydroxy acids. Presence of a chelating agent improves the stability of metallic ions in the solution, and suppresses precipitation, so that improvement of the coating film formation promoting effect can be expected.

As the pH adjuster, various acids and alkalis can be used without particular limitation. The pH of the coating film-forming composition is preferably 2.8 to 6.2, more preferably 3.0 to 6.0. When the pH is 2.8 or more, etching of a metal surface is suppressed, so that coating film formability can be improved, and the stability of the solution is improved because the amount of metal dissolved is small. When the pH is 6.2 or less, the stability of copper ions in the solution is high, so that the coating film formation promoting effect of copper ions tends to be enhanced. Suppression of condensation of a silane coupling agent in a pH range of weak acidity may contribute to improvement of coating film formability.

In order to prevent etching due to the oxidation of a metal, it is preferable that the coating film-forming composition contains the aforementioned range of metallic ions such as copper ions, while being substantially free of an oxidizing agent that oxidizes the metal on which a coating film is to be formed. Examples of metal oxidizing agents include hypochlorous acid, chlorous acid, chloric acid, perchloric acid, permanganic acid, persulfuric acid, percarbonic acid, hydrogen peroxide, organic peroxides, and salts thereof. The content of the oxidizing agent in the coating film-forming composition is preferably 0.5 wt % or less, more preferably 0.1 wt % or less, and still more preferably 0.05 wt % or less. When the coating film-forming composition is substantially free of a metal oxidizing agent, the elution of the metal is reduced, and the stability of the solution can be improved.

[Formation of Coating Film on Metal Member Surface]

The above coating film-forming composition is brought into contact with a surface of a metal member, and the solvent is removed by drying as necessary. As a result, as shown in FIG. 1, a coating film 12 is formed on a surface of the metal member 11. The coating film 12 is a film for improving adhesiveness to a resin. When the coating film is disposed on a surface of a metal member, the adhesiveness between the metal member and a resin improves.

Examples of metal members include the surface of a copper foil (electrolytic copper foil, rolled copper foil) used for electronic components such as semiconductor wafers, electronic substrates, and leadframes, decorative items, building materials, and the like, the surface of a copper-plated film (electroless copper-plated film, electrolytic copper-plated film), and also wire-shaped, rod-shaped, tube-shaped, and plate-shaped copper materials for various applications. In particular, the coating film-forming composition of the present invention has excellent coating film formability on a copper or copper alloy surface. Therefore, as the metal member, it is preferable to use a copper foil, a copper-plated film, a copper material, or the like. The surface of the metal member may be flat or roughened. By forming a coating film on a surface of a roughened metal member, adhesion between the metal member and the resin can be further improved.

As described above, use of the coating film-forming composition of the present invention enables formation of a coating film of a silane coupling agent while suppressing etching of metal. Thus, the composition can be applied to thin wires such as copper wires for printed wiring boards.

The formation of a coating film on a surface of a metal member is performed under the following conditions, for example.

First, a surface of the metal member is washed with an acid or the like. Next, the metal surface is immersed in the above coating film-forming composition and subjected to an immersion treatment for about 2 second to 5 minutes. The temperature of the solution at this time is preferably about 10 to 50° C., and more preferably about 15 to 35° C. In the immersion treatment, shaking may be performed as necessary. Subsequently, the solution attaching to the metal surface is removed by drying, rinsing, etc. whereby a surface-treated metal member 10 having a coating film 12 on a surface of the metal member 11 is obtained.

As described above, in the case of a conventional coating film-forming composition, it is necessary that after the immersion treatment of a metal member, drying is performed under the condition where the solution is attaching to the surface of a metal member, and the solution is concentrated/dried to form a coating film. In contrast, in the case of the coating film-forming composition of the present invention, even during immersion in the solution (when not in contact with air), coating film is formed on a metal surface. Accordingly, even in the case where the solution attaching to the metal surface is removed by rinsing after immersion in the solution without performing air-drying or the like under the condition where the solution is attaching to the metal surface, a coating film having excellent adhesiveness to a resin can be uniformly formed on the metal surface. In the case where drying in air is performed with the solution attaching to the metal surface, a coating film having excellent adhesiveness to a resin can be formed on the metal surface even by a short-time drying treatment. Accordingly, the time period required for coating film formation on a metal surface can be reduced, and also the process of coating film formation can be simplified.

Although the mechanism of improvement in coating film formability by presence of halide ions and metallic ions in addition to an amino group-containing silane coupling agent is uncertain, one probable cause is that when copper ions and halide ions act on a metal surface, an amino group-containing silane coupling agent is caught, and adsorbed to the metal surface to contribute to coating film formation on the metal surface. It is considered that in this embodiment, the solution contains copper ions and halide ions, and therefore even nitrogen atoms of amino groups other than nitrogen-containing aromatics act on the metal surface together with copper ions and halide ions to form a coating film.

For rinsing the coating film-forming composition in the form of a solution attaching to the metal surface, water or an aqueous solution may be used. In particular, in the case where rising is performed with a weak acid or alkali aqueous solution, the non-uniformity of the coating film tends to decrease, resulting in improved adhesiveness to a resin. As a weak acid, for example, sulfuric acid or hydrochloric acid at about 0.1 to 6 wt % is preferable, and as an alkali, an aqueous NaOH solution or an aqueous KOH solution at about 0.1 to 5 wt % is preferable.

By using the coating film-forming composition of the present invention, even when the time from when the coating film-forming composition is brought into contact with a surface of a metal member by immersion, spraying, or the like to when the solution attaching to the surface of the metal member is removed (in the case of immersion, the time from the removal of a metal member from the solution to rinsing; in the case of spraying, the time from the completion of spraying to rinsing) is 2 minutes or less, a coating film having excellent adhesiveness to a resin can be formed on the metal surface. In terms of improving the production efficiency, the time from when the coating film-forming composition is brought into contact with a surface of a metal member to when the solution attaching to the surface of the metal member is removed (rinsing) may be 1.5 minutes or less, or 1 minute or less.

As described above, the coating film-forming composition of the present invention is excellent in coating film formability in a solution and also has high absorptivity on a metal surface. Therefore, a coating film can be formed on a metal surface even only by an immersion treatment, and even when the solution is removed by rinsing the metal surface without drying after immersion, coating film formation state on the metal surface is maintained. In addition, in the case where the coating film-forming composition is applied to a composite member of a metal and another material, a coating film can be selectively formed on a metal surface.

Although the coating film 12 is formed only on one side of the plate-shaped metal member 11 in FIG. 1, the coating film may also be formed on both sides of a metal member. It is preferable that the coating film is formed over the entire surface joined to a resin. The method for forming a coating film on a surface of a metal member is not limited to the immersion method, and it is possible to select a suitable application method such as spraying or bar coating.

[Metal-Resin Composite]

Figure 2:
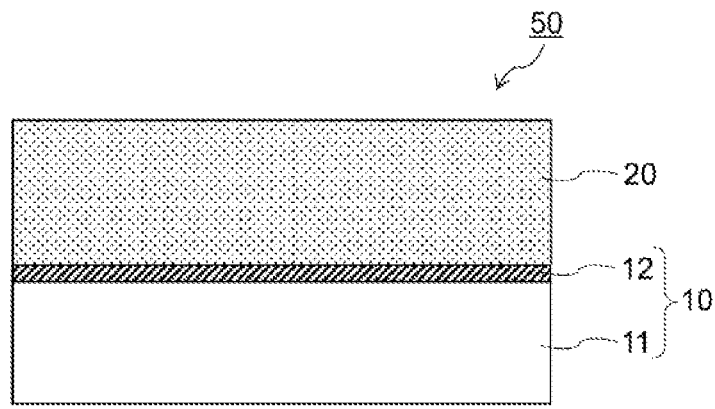
FIG. 2 is a schematic cross-sectional view showing one embodiment of a metal-resin composite.

Onto the coating film 12-formed surface of the surface-treated metal member 10, a resin member 20 is joined, whereby a metal-resin composite 50 shown in FIG. 2 is obtained. Although the resin member (resin layer) 20 is stacked only on one side of the plate-shaped metal member 11 with the coating film 12 therebetween in FIG. 2, the resin member may also be joined on both sides of a metal member.

Before deposition of the resin member on the coating film, treatment for improvement of the wettability of the coating film surface or treatment suitable for the storage environment may be performed. Treatment such as heating may be performed before deposition of the resin member on the coating film. A coating film formed from the above-described composition is less degraded by heating, and therefore can exhibit high adhesiveness between the metal and the resin even before deposition of the resin member or when heating is performed during deposition of the resin member.

As the method for joining the surface-treated metal member 10 and the resin member 20 together, it is possible to employ a method such as lamination pressing, lamination, coating, injection molding, or transfer molding. After deposition of the resin layer, the resin may be cured by heating or active ray irradiation.

The resin constituting the above resin member is not particularly limited, and examples thereof include thermoplastic resins such as acrylonitrile/styrene copolymer resin (AS resin), acrylonitrile/butadiene/styrene copolymer resin (ABS resin), fluorine resin, polyamide, polyethylene, polyethylene terephthalate, polyvinylidene chloride, polyvinyl chloride, polycarbonate, polystyrene, polysulfone, polypropylene, and liquid crystal polymer, thermosetting resins such as epoxy resin, phenol resin, polyimide, polyurethane, bis-maleimide-triazine resin, modified polyphenylene ether, and cyanate ester, and UV-curable resins such as UV-curable epoxy resin and UV-curable acrylic resin. These resins may be modified with a functional group or may also be reinforced with, for example, glass fibers, aramid fibers, or other fiber.

The coating film formed on a metal surface using the coating film-forming composition of the present invention has excellent adhesiveness between the metal and a resin. Therefore, without additional layers therebetween, the resin member 20 can be directly joined onto the coating film 12 disposed on the metal member surface. In other words, when the coating film-forming composition of the present invention is used, without additional treatments, a metal-resin composite having high adhesiveness can be obtained by simply forming a coating film on a metal member surface, and joining a resin member directly thereonto.

EXAMPLES

Hereinafter, examples of the present invention will be described together with comparative examples. Incidentally, the present invention is not limited to the following examples.

[Preparation of Test Copper Foil]

An electrolytic copper foil (3EC-III manufactured by Mitsui Mining & Smelting Co., Ltd., thickness: 35 μm) cut to 100 mm×100 mm was immersed and shaken in a 6.25 wt % sulfuric acid aqueous solution at normal temperature for 20 seconds to perform a derusting treatment, then rinsed with water, and dried to give a test copper foil (test piece).

[Preparation of Solution]

Each component was dissolved in ion exchange water to adjust blending quantity (concentrations) shown in Table 1 and Table 2, and then 1.0 N hydrochloric acid or a 1.0 N aqueous sodium hydroxide solution was added to make the pH shown in Table 1 and Table 2, thereby preparing a solution.

The silane coupling agents A to M in Tables 1 and 2 areas follows.

Silane coupling agent A: 3-aminopropyldimethoxymethylsilane

Silane coupling agent B: 3-aminopropyltrimethoxysilane

Silane coupling agent C: 3-(2-aminoethylamino)propyldimethylmethaxysilane

Silane coupling agent D: 3-aminopropylmethyldiethoxysilane

Silane coupling agent E: 3-(2-aminoethylamino)propyltrimethoxysilane

Silane coupling agent F: trimethoxy[3-(phenylamino)propyl]silane

Silane coupling agent G: 3[2-(2-aminoethylamino)ethylamino]propyltrimethoxysilane Silane coupling agent H: [3-(6-aminohexylamino)propyl] trimethoxysilane Silane coupling agent I: 3-ureidopropyltrimethoxysilane Silane coupling agent J: 3-glysidyloxypropyltrimethoxysilane Silane coupling agent K: 3-mercaptopropyltrimethoxysilane Silane coupling agent L: benzotriazole-based silane coupling agent of the following formula (N-(3-trimethoxysilylpropyl) benzotriazole-1-carboxamide)

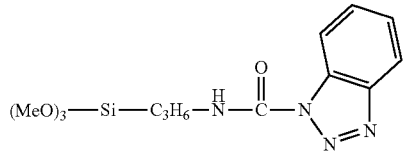

Silane coupling agent M: triazole-based silane coupling agent of the following formula (N-[3-(triethoxysilyl) propyl]-5-amino-3-[3-(triethoxysilyl) propylthio]-1H-1,2,4-triazole-1-carboxamide)

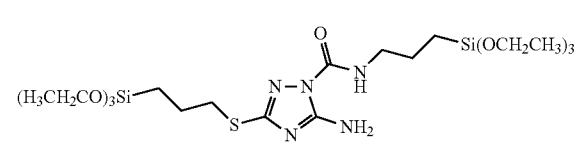

Commercialized products were used as the silane coupling agents A to K. The silane coupling agent L was synthesized on the basis of Example 1 in JP-A-2016-79130. The silane coupling agent M was synthesized on the basis of Reference Example 4-1 in JP-A-2018-16865.

[Evaluation]

The test piece was immersed and oscillated in the solutions (25° C.) of Tables 1 and 2 for 60 seconds. Thereafter, the test piece was taken out from the solution, immediately washed with water, and then dried at room temperature. Coating film formability was evaluated from the peak area of Si—O near 1110 cm$^{-1}$ in an infrared absorption spectrum of the test piece and visually observed appearance.

<Si—O Peak Area>

The infrared absorption spectrum was measured under the conditions of detector: DLaTGS/KBr, accessory: RAS, resolution: 8 cm$^{-1}$, cumulated number: 16 and incidence angle: 75° by a reflection absorption method (PAS method) using a FNR analysis apparatus ("NICOLET 389" manufactured by Thermo Fisher Scientific). In an IR spectrum with a wave number on the abscissa and an absorbance on the ordinate, the straight line connecting a measurement point at a wave number of 1180 cm$^{-1}$ to a measurement point at a wave number 1070 cm$^{-1}$ was set as a baseline, and the area of a region surrounded by the baseline and the curve of the spectrum was set as a peak area of Si—O. In Comparative Examples 1 to 10, there was no peak near 1110 cm-1, and therefore the peak area was set to 0.

<Appearance>

The appearance was visually evaluated on the basis of the following criteria.

A: The gloss of the copper foil is retained.

B: The surface of the copper foil is roughened to lose gloss.

C: A smut is deposited on the surface of the copper foil to lose gloss.

<Resin Adhesiveness>

The test piece subjected to the coating film formation treatment was heated in the air at 130° C. for 60 minutes to be thermally degraded, a buildup film ("ABF" manufactured by Ajinomoto Fine-Techno Co., Inc.) was then laminated in vacuum on a test piece, and heated under recommended conditions to thermally cure the film. A cut 10 mm in width and 60 mm in length was made in a copper foil from a side opposite to a film laminated surface of the test piece, the tip of the copper foil was grasped with a gripper, and a 90° peeling test was conducted over a length of 60 mm at a peel rate of 50 mm/min in accordance with JIS C6481 to measure the peel strength.

Tables 1 and 2 show the compositions and the results of evaluation of the solutions of Examples and Comparative Examples.

TABLE 1

| | Solution composition | | | Evaluation results | | | | |
|---|---|---|---|---|---|---|---|---|
| | Combination | | | Element concentration | | | | Peel |
| | Component | Concentration (wt %) | pH | Si (mM) | Cu (mM) | Si/Cu | Si—O Area | Appearance | strength (N/mm) |
| Example 1 | Silane coupling agent A | 1.0 | 5.9 | 60.5 | 17.9 | 3.4 | 0.12 | A | 0.37 |
| | CuBr$_2$ | 0.4 | | | | | | | |
| Example 2 | Silane coupling agent B | 3.0 | 5.5 | 167 | 29.3 | 5.7 | 0.54 | A | 0.47 |
| | CuCl$_2$•2H$_2$O | 0.5 | | | | | | | |
| | NaCl | 5.0 | | | | | | | |
| Example 3 | Silane coupling agent C | 0.2 | 4.4 | 10.5 | 4.0 | 2.6 | 0.23 | A | 0.41 |
| | CuSO$_4$•5H$_2$O | 0.1 | | | | | | | |
| | KI | 1.0 | | | | | | | |
| Example 4 | Silane coupling agent D | 10.0 | 4.2 | 452 | 48.1 | 9.4 | 0.28 | A | 0.40 |
| | CuSO$_4$•5H$_2$O | 1.2 | | | | | | | |
| | NaCl | 10.0 | | | | | | | |
| Example 5 | Silane coupling agent E | 0.4 | 5.0 | 18.0 | 8.0 | 2.2 | 0.84 | A | 0.51 |
| | CuSO$_4$•5H$_2$O | 0.2 | | | | | | | |
| | KBr | 0.3 | | | | | | | |
| Example 6 | Silane coupling agent E | 0.4 | 5.3 | 34.9 | 8.0 | 4.4 | 0.77 | A | 0.53 |
| | Silane coupling agent J | 0.4 | | | | | | | |
| | CuSO$_4$•5H$_2$O | 0.2 | | | | | | | |
| | KBr | 0.3 | | | | | | | |
| Example 7 | Silane coupling agent F | 0.03 | 4.5 | 1.2 | 2.0 | 0.59 | 0.65 | A | 0.46 |
| | CuSO$_4$•5H$_2$O | 0.05 | | | | | | | |
| | KBr | 0.1 | | | | | | | |
| Example 8 | Silane coupling agent G | 0.2 | 3.0 | 7.6 | 1.2 | 6.5 | 0.22 | A | 0.42 |
| | CuCl$_2$•2H$_2$O | 0.02 | | | | | | | |
| | KBr | 0.5 | | | | | | | |
| Example 9 | Silane coupling agent H | 0.2 | 5.0 | 7.2 | 0.4 | 16.1 | 0.61 | A | 0.49 |
| | CuBr$_2$ | 0.01 | | | | | | | |
| Example 10 | Silane coupling agent I | 0.4 | 5.1 | 36.0 | 8.0 | 4.5 | 0.41 | A | 0.46 |
| | CuSO$_4$•5H$_2$O | 0.2 | | | | | | | |
| | KBr | 0.2 | | | | | | | |
| Example 11 | Silane coupling agent L | 0.04 | 5.9 | 1.2 | 4.0 | 0.31 | 0.20 | A | 0.38 |
| | CuSO$_4$•5H$_2$O | 0.1 | | | | | | | |
| | KI | 0.01 | | | | | | | |
| Example 12 | Silane coupling agent M | 0.2 | 5.0 | 7.0 | 4.0 | 1.8 | 1.12 | A | 0.53 |
| | CuSO$_4$•5H$_2$O | 0.1 | | | | | | | |
| | KBr | 0.4 | | | | | | | |

TABLE 2

| | Solution composition | | | Evaluation results | | | | |
|---|---|---|---|---|---|---|---|---|
| | Combination | | | Element concentration | | | | Peel |
| | Component | Concentration (wt %) | pH | Si (mM) | Cu (mM) | Si/Cu | Si—O Area | Appearance | strength (N/mm) |
| Comparative Example 1 | Silane coupling agent K | 0.4 | 5.0 | 20.4 | 8.0 | 2.5 | 0 | A | 0.14 |
| | CuSO$_4$•5H$_2$O | 0.2 | | | | | | | |
| | KBr | 0.3 | | | | | | | |
| Comparative Example 2 | Silane coupling agent J | 0.4 | 5.0 | 16.9 | 8.0 | 2.1 | 0 | C | 0.08 |
| | CuSO$_4$•5H$_2$O | 0.2 | | | | | | | |
| | KBr | 0.3 | | | | | | | |
| Comparative Example 3 | Silane coupling agent E | 0.4 | 5.0 | 18.0 | 0.0 | — | 0 | A | 0.18 |
| | KBr | 0.3 | | | | | | | |
| Comparative Example 4 | Silane coupling agent B | 3.0 | 5.3 | 167.3 | 4.0 | 41.8 | 0 | A | 0.13 |
| | CuSO$_4$•5H$_2$O | 0.1 | | | | | | | |
| | KBr | 0.3 | | | | | | | |

TABLE 2-continued

| | Solution composition | | | | | | Evaluation results | | |
| --- | --- | --- | --- | --- | --- | --- | --- | --- | --- |
| | Combination | | | Element concentration | | | | | Peel |
| | Component | Concentration (wt %) | pH | Si (mM) | Cu (mM) | Si/Cu | Si—O Area | Appearance | strength (N/mm) |
| Comparative Example 5 | Silane coupling agent E CuBr$_2$ | 0.4 1.8 | 4.3 | 18.0 | 80.6 | 0.22 | 0 | B | 0.05 |
| Comparative Example 6 | Silane coupling agent E CuSO$_4$•5H$_2$O KBr | 0.4 0.1 0.3 | 2.6 | 18.0 | 4.0 | 4.5 | 0 | B | 0.07 |
| Comparative Example 7 | Silane coupling agent E CuSO$_4$•5H$_2$O KBr | 0.4 0.1 0.3 | 6.4 | 18.0 | 4.0 | 4.5 | 0 | A | 0.23 |
| Comparative Example 8 | Silane coupling agent E CuSO$_4$•5H$_2$O | 0.4 0.1 | 5.3 | 18.0 | 4.0 | 4.5 | 0 | A | 0.20 |
| Comparative Example 9 | Silane coupling agent E CuSO$_4$•5H$_2$O KBr | 0.4 2.0 0.3 | 5.0 | 18.0 | 80.1 | 0.22 | 0 | B | 0.07 |
| Comparative Example 10 | Silane coupling agent E CuSO$_4$•5H$_2$O KBr | 0.4 0.01 0.3 | 5.0 | 18.0 | 0.4 | 44.9 | 0 | A | 0.28 |

In Examples 1 to 12 where the copper foil was treated with a solution containing an amino group-containing silane coupling agent, copper ions and halide ions, the metallic gloss of the copper foil was retained and an Si—O-derived peak was observed in an infrared absorption spectrum after the immersion treatment in the solution, which indicates that a coating film of the silane coupling agent was formed. In Examples 1 to 12, the peel strength between the copper foil and the buildup film was 0.3 N/mm or more, and thus excellent adhesiveness was exhibited. Since there is a correlation between the Si—O peak area and the peel strength (adhesive strength), and the adhesive strength tends to be enhanced as the Si—O peak area increases, formation of the coating film of the silane coupling agent contributes to improvement of adhesive strength.

In Comparative Example 3 with no copper ions and Comparative Example 8 with no halide ions, a coating film was not formed. A coating film was not formed in Comparative Example 1 where the silane coupling agent E of Example 5 was replaced with the silane coupling agent K, which is free of amino groups. Comparative Example 2 using the silane coupling agent J, which is free of amino groups, showed the same result. In Comparative Example 2, a smut was deposited on the surface of the copper fail, and the adhesive strength significantly decreased.

On the other hand, in Example 6 where the silane coupling agent E containing amino groups and the silane coupling agent J free of amino groups were used in combination, a smut was not generated, and adhesive strength as high as that in Example 5 was exhibited. These results indicate that the silane coupling agent containing amino groups interacted with copper ions and halide ions in the solution to promoted formation of a coating film of the silane coupling agent.

In Comparative Example 5 and Comparative Example 9 where the copper ion concentration was high, a coating film was not formed, and the surface was roughened by etching of copper. It is considered that in these comparative examples, a coating film was not formed because the copper oxidizing (etching) effect of copper ions exceeded formation of a coating film of the silane coupling agent due to a high copper ion concentration.

In Comparative Examples 4 and 10 where the Si/Cu ratio was high and the amount of copper with respect to the silane coupling agent was small, a coating film was not formed. In Example 9 with the same copper ion concentration as in Comparative Example 10, a coating film was formed, so that good adhesiveness with the resin was achieved. These results indicate that the Si/Cu ratio is important. It is considered that the amount of the silane coupling agent was excessive in Comparative Examples 4 and 10, so that copper ions in the solution were stabilized by the silane coupling agent, leading to small interaction between copper ions and the copper foil surface; and for this reason, etc., the coating film formation promoting effect was not sufficiently exhibited, leading to absence of coating film formation by immersion only.

In Comparative Example 6 where the pH was low with the same composition as in Example 5, a coating film was not formed, and the surface was roughened by etching of copper. In the pH range, the etching effect of copper ions may exceed formation of a coating film of the silane coupling agent because the etching effect of copper ions is high.

In Comparative Example 7 where the pH was high with the same composition as in Example 5, a coating film was not formed. One of reasons why a coating film was not formed at a near-neutral pH may be that the stability of copper ions in the solution was low, so that the coating film formation promoting effect of copper ions was insufficient.

The above results show that by treating a metal surface with a solution containing an amino group-containing silane coupling agent, copper ions and halide ions, and having an Si/Cu ratio and a pH falling within predetermined ranges, a coating film of the silane coupling agent is formed only by immersion for a short time, and it is possible to form a complex excellent in adhesiveness between the metal and the resin. The silane coupling agent may contain amino groups, and as in Examples 1 to 9, a coating film contributing to improvement of adhesiveness with the resin can be easily formed on a metal surface even when a general-purpose silane coupling agent is used.

The invention claimed is:
1. A coating film-forming composition that is capable of forming a coating film on a surface of copper or copper alloy for improving adhesiveness to a resin,
the composition is a solution comprising: a silane coupling agent having at least one selected from the group consisting of primary amino groups and secondary amino groups; a copper ion; and a halide ion, wherein the solution has a copper ion concentration of 0.1 to 40 mM, an amount of Si based on an amount of Cu in the solution is 30 or less, in terms of a molar ratio, and a pH of the solution is 2.8 to 6.2.

2. A coating film-forming composition that is capable of forming a coating film on a surface of copper or copper alloy for improving adhesiveness to a resin, the composition is a solution comprising: a silane coupling agent having an —$NH_2$ group at a terminal; a copper ion; and a halide ion, wherein the solution has a copper ion concentration of 0.1 to 40 mM, an amount of Si based on an amount of Cu in the solution is 30 or less, in terms of molar ratio, and a pH of the solution is 2.8 to 6.2.

3. The coating film-forming composition according to claim 1, wherein the amount of Si based on the amount of Cu in the solution is 0.3 or more, in terms of molar ratio.

4. The coating film-forming composition according to claim 1, wherein a halide ion concentration in the solution is 0.3 mM or more.

5. A method for producing a surface-treated metal member, comprising bringing the coating film-forming composition according to claim 1 into contact with a surface of a metal member of copper or copper alloy, thereby forming a coating film on the surface of the metal member.

6. A method for producing a metal-resin composite, comprising forming a coating film on a surface of a metal member of copper or copper alloy by the method according to claim 5, and then joining a resin member onto the coating film.

* * * * *